United States Patent [19]

Gamble

[11] Patent Number: 4,763,034
[45] Date of Patent: Aug. 9, 1988

[54] MAGNETICALLY ENHANCED STEPPING MOTOR

[75] Inventor: John G. Gamble, Hull, Mass.

[73] Assignee: Sigma Instruments, Inc., Braintree, Mass.

[21] Appl. No.: 72,213

[22] Filed: Jul. 10, 1987

[51] Int. Cl.⁴ .................................. H02K 21/00
[52] U.S. Cl. ..................... 310/181; 310/49 R; 310/154; 310/156
[58] Field of Search ............... 310/40, 49 R, 156, 181, 310/154, 177

[56] References Cited

U.S. PATENT DOCUMENTS 3,757,150  9/1973  Benezech .................. 310/181
4,564,778  1/1986  Yoshida .................... 310/181 X

OTHER PUBLICATIONS

"Higher Torque From Hybrid Stepper Motors", 903 Machine Design, 57 (1985) Apr., pp. 23–25 and 28–29.

Primary Examiner—Mark O. Budd
Attorney, Agent, or Firm—Leo Stanger

[57] ABSTRACT

The electric motor includes a mover, which may be a rotor or actuator, and a stator having a number of poles projecting toward the mover. The poles have soft-magnetic teeth projecting toward the mover and extending transverse to the direction of mover movement, and the mover has soft-magnetic teeth projecting toward the stator teeth and extending transverse to the direction of mover movement. Windings energize the stator to move the mover. Dividing each pole transverse to the direction of mover movement to define two pole portions per pole, and locating permanent magnetic material between stator teeth in only one portion of each of the poles, enhances the motor torque while achieving a saving of permanent magnetic material. Preferably the magnetic material exists on alternate pole portions in successive poles.

20 Claims, 4 Drawing Sheets

MAGNETICALLY ENHANCED STEPPING MOTOR

RELATED APPLICATIONS

This application is related to U.S. application Ser. No. 612,563 filed May 21, 1984 of Ralph Horber, and U.S. application Ser. No. 735,935 filed May 20, 1985 of Ralph Horber and John Gamble.

BACKGROUND OF THE INVENTION

This invention relates to electric motors and particularly to stepping motors which are magnetically enhanced to increase the effective torque produced by the motor.

Generally a stepping motor includes a rotor with outwardly-projecting peripherally-spaced longitudinally-extending rotor teeth which interact with inwardly-projecting peripherally-spaced longitudinally-extending stator teeth. The latter are mounted in sets on peripherally-spaced inwardly-projecting longitudinally-extending stator poles such that the stator teeth on one pole may align with the opposing rotor teeth while the teeth on the adjacent pole are partially misaligned with the rotor teeth, and the stator teeth on the next peripherally-spaced pole align with the valleys between opposing rotor teeth. In a so-called "hybrid" motor, the rotor contains two axially aligned sections with teeth of one section aligned with the valleys of the other section. A permanent magnet between the two rotor sections magnetizes the sections in opposite polarities. Appropriately energizing coils on the stator poles causes an interaction between the stator and rotor teeth that turns the rotor.

In some stepping motors, the pitches on the stator teeth differ from those on the rotor teeth. The aforementioned stepping motor principles of operation are also used on linear stepping motors where the rotor is replaced by a linear actuator.

The efficiencies and torques of such motors have recently been increased by inserting radially-poled permanent magnetic materials in the valleys between the stator teeth or the stator teeth and rotor teeth. Preferably, the materials used are high coercive force materials such as samarium cobalt or neodymium boron iron alloys which are formed into a powder, pressed, sintered and glued into the valleys. While materials such as ferrite can also be used, these are less effective. The preferred materials are generally expensive, difficult to handle, and require a number of manufacturing steps. They also add to the overall weight of the motor.

SUMMARY OF THE INVENTION

An object of the invention is to improve electric motors.

Another object of the invention is to overcome the afore-mentioned disadvantages.

According to a feature of the invention, these objects are attained in whole or in part in a motor having a mover (rotor or actuator), a stator having a plurality of poles projecting toward the mover, the poles having teeth projecting toward the mover and composed of soft magnetic material, the mover having teeth projecting toward the stator teeth and composed of soft magnetic material, windings on the stator, and the stator teeth on each of the poles extending in the longitudinal direction, by dividing the poles transverse to the longitudinal direction into two pole portions with only one portion of each of the poles having permanent magnetic material extending along at least one tooth for producing a magnetic field poled transverse to the mover.

According to another feature of the invention, the stator teeth extend substantially transverse to the direction in which the rotor moves relative to the stator.

According to another feature of the invention, the mover includes a permanent magnetic arrangement for applying a magnetic field to the mover teeth.

According to another feature of the invention, the mover is divided into two mover portions each having teeth extending transverse to the direction of movement of the teeth and includes a permanent magnet between the mover portions poled for magnetizing one mover portion in one direction and one mover portion in the other direction.

According to another feature of the invention, the stator teeth on each of the poles extend in a direction transverse to the movement of the mover, one of the portions of each of the poles is a front portion and the other a rear portion, and only the front portion of alternate ones of the poles and only the rear portion of the poles adjacent to the alternate poles have the magnetic material.

According to another feature of the invention, the portions with the magnetic material have the magnetic material adjacent a number of the teeth in each of the portions.

These and other features of the invention are pointed out in the claims. Other objects and advantages of the invention will become evident from the following detailed description when read in light of the accompanying drawings.

The invention furnishes almost all the torque increase obtained by applying the magnetic material the entire length of the stator teeth, using only 50% of the magnetic material in previous magnetically enhanced motors.

DETAILED DESCRIPTION OF PREFERRED EMBODIMENT

Figure 1:
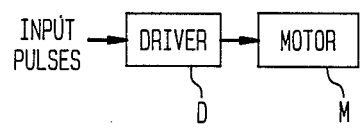
FIG. 1 is a block diagram illustrating a system embodying the invention.

In FIG. 1, a driver D receives input pulses from an external source (not shown) and drives a motor M. The input pulses include external rotation direction signals which instruct the driver D to rotate the motor M in one or the other direction.

Figure 2:
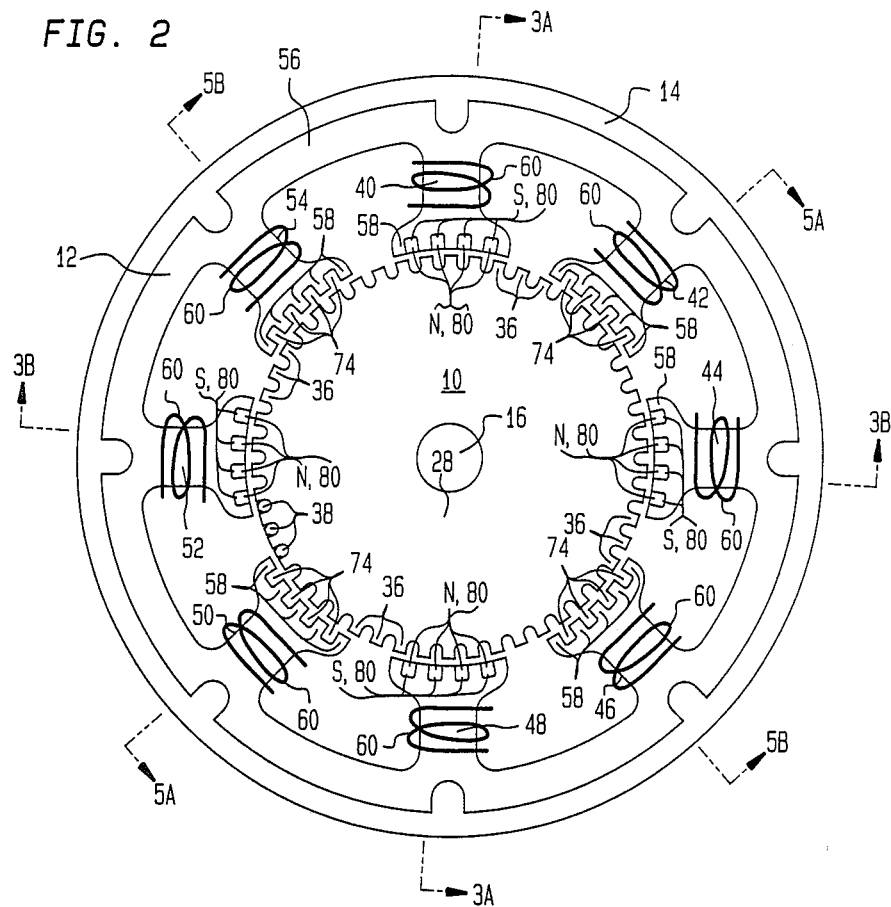
FIG. 2 is a cross-sectional view of a motor in FIG. 1 embodying features of the invention and taken along the cross section of 2—2 of FIG. 3.
Figure 3:
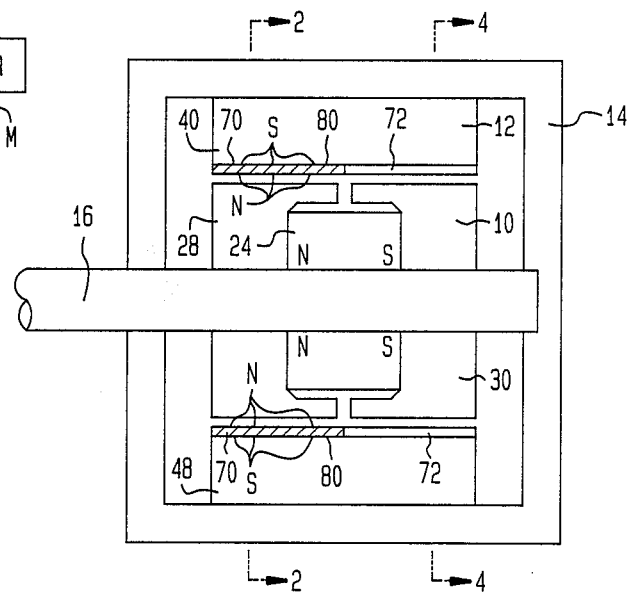
FIG. 3 is a cross-sectional diagram of the motor in FIG. 2 taken along the cross section 3A—3A and 3B—3B.
Figure 4:
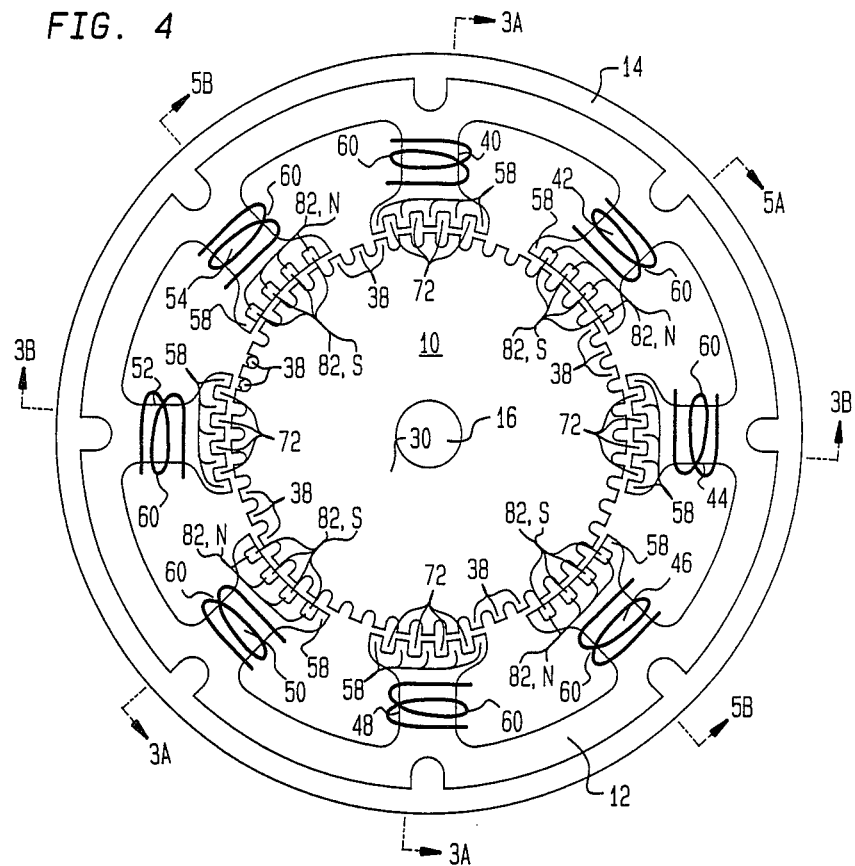
FIG. 4 is a cross-sectional view of the motor embodying the invention across the section 4—4 of FIG. 3.
Figure 5:
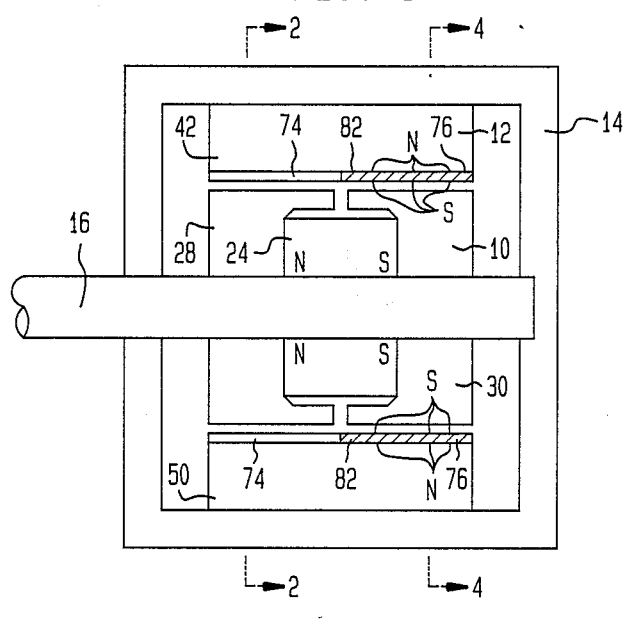
FIG. 5 is a sagittal section view of the motor embodying the invention taken along section 5A—5A or 5B—5B.

The motor M appears in more detail in FIGS. 2-5. In these figures a rotor 10 rotates within a stator 12 mounted within a housing schematically shown as 14. A shaft 16 projects through the housing 14 and is keyed to the rotor 10 for rotation therewith. Suitable bearings not shown mount the rotor 10 and the shaft 16 to be rotatable within the housing 14. For simplicity, the rotor teeth are shown in FIGS. 3 and 5.

As specifically shown in FIGS. 3 and 5, the rotor 10 is composed of a permanent magnet 24 and two cap-shaped rotor pole shoes 28 and 30 encapsulating the magnet 24 at its axial ends to form front and rear rotor segments. For simplicity, the poles 28 and 30 will also be referred to as rotor segments 28 and 30. As more particularly shown in FIGS. 2 and 4, the rotor segments 28 and 30 carry 50 peripherally spaced teeth 36 and 38 projecting radially outward. The number of teeth shown is only an example. Other embodiments of the invention utilize rotor pole shoes with other numbers of teeth such as 40 or 48. In the example shown the angular or peripheral tooth pitch, that is, the angular distance between like points on adjacent rotor teeth, is 7.2 degrees. As seen from FIGS. 3 and 5, the entire segment 28 is magnetized by the permanent magnet 24 to exhibit north polar magnetization. The permanent magnet 24 magnetizes the entire segment 30 to exhibit a south polar magnetization. The teeth 36 on the rotor segment 28 are spaced about the entire periphery of the rotor segment 28. The teeth extend longitudinally along the axial direction of the rotor segment 28. The rotor segment 30 is identical to the segment 28 and carries outwardly directed peripherally spaced radial teeth 38 identical to the radial teeth 36 in spacing and number. However, the segment 30 is mounted on or keyed to the shaft, or the radial teeth are cut, so that the rotor teeth 38 are angularly offset by ½ tooth pitch from the teeth 36. Hence, looking axially, the teeth 38 appear midway between the teeth 36. This is most precisely shown in the left hand portion of FIG. 2. For simplicity, the rotor teeth 38 shown to be sticking out between and behind the rotor teeth 36 are not illustrated in the remainder of the rotor. However, it should be understood that the rotor teeth do, in fact, exist in these locations behind the rotor segment 28.

As shown more particularly in FIGS. 2 and 4, eight angularly displaced poles 40, 42, 44, 46, 48, 50, 52 and 54 project inwardly from a common circumscribing stator cylinder 56 to form the stator 12. As shown in FIGS. 3 and 5, the poles extend longitudinally along the entire axial dimension of the stator 12 to the ends of or beyond the rotor 10. Five stator pole teeth or stator teeth 58 form the inner radial ends of each pole 40–54. The pole teeth 58 are formed along an imaginary cylindrical surface coaxial with the rotor and spaced slightly apart from the rotor teeth 36 and 38 across a gap. In this embodiment, the rotor tooth pitch and the stator tooth pitch are the same. In others they are different. The poles 40 to 54 and their respective teeth are angularly arranged so that the teeth on two opposite poles can directly oppose the rotor teeth 36 on the rotor segment 28 when the teeth on poles 44 and 52 ninety degrees therefrom are completely out of alignment with the teeth 36 on the rotor segment 28. The teeth 36 on the remaining forty-five degree angularly oriented poles 42, 46, 50 and 54 are angularly arranged so that they are ninety degrees and two hundred seventy degrees out of phase with the angular alignment of the rotor teeth 36 of the rotor segment 28 in the same position of the rotor.

The pole teeth 58 extend longitudinally parallel to the rotor axis from one end of the stator 12 to the other.

Thus when the teeth 58 and the poles 52 and 44 are one hundred eighty degrees out of alignment with the teeth 36 of the segment 28, they are completely aligned with the teeth 38 on the segment 30. At the same time, the teeth 58 on the poles 40 and 48 are completely out of alignment with the teeth 38.

Stator coils 60, when energized by the driver D, magnetize the poles in a sequence that causes the pole teeth to interact with the magnetic field, formed by the permanent magnet 24 of the rotor teeth 36 and 38 to rotate the rotor 10. Various drivers D with different types of energizing sequences for producing larger or smaller steps with each energizing pulse are known. Some of these are for example disclosed in U.S. Pat. No. 4,255,696 of John H. Field.

The valleys or interstices between the teeth 58 on the poles 40, 44, 48 and 52 are divided into front and rear longitudinal intervals 70 and 72 as shown in FIG. 3. The valleys or interstices between the teeth 58 on the poles 42, 46, 48 and 52 are divided into longitudinal halves in the form of front longitudinal intervals 74 and rear longitudinal intervals 76. According to the invention, the front longitudinal intervals 70 of poles 40, 44, 48 and 52 are filled with a high magnetic coercivity material 80 while the intervals 72 remain empty. At the same time, the rear longitudinal magnetic intervals 76 of poles 42, 46, 50 and 54 are filled with permanent magnetic material 82 of the same type as material 80 while the front longitudinal intervals 74 remain empty. The high magnetic coercivity material is preferably samarium cobalt in the form of $SmCo_5$. According to another embodiment of the invention, the material is in the form of $Sm_2Co_{17}$. According to other embodiments of the invention it is a neodymium boron iron alloy or Ferrite. The magnetic materials may for example be constructed by forming the ingredients into a powder, pressing the latter, sintering the powder into a rod, and gluing the rods into the longitudinal intervals 70 and 76. For simplicity, the magnets formed for the magnetic material 80 are termed slot magnets in that they fit into slots between the stator teeth.

The material 80 in the front intervals 70 is poled radially so that the radially inward polarity is north and the radially outward pole of the magnetic material 80 is south. In this manner, the magnetic materials 80 oppose the north polar magnetization of the rotor segment 28. The latter, although of soft magnetic material, receives its magnetization from the north pole of the axially magnetized permanent magnet 24. The magnetic material 82 in the intervals 76 is also poled radially, however, with the south poles radially inward and the north poles radially outward. In this manner the magnetic materials of each interval 76 oppose the south polar magnetization of the rotor segment 30 caused by the axial south polar magnetization of the permanent magnet 24. In this regard it should be noted that except for the permanent magnetic materials 80 and 82, the stator is composed of soft magnetic material. With the exception of the permanent magnet 24 and the non-magnetic stainless steel shaft 16, the rotor 10 is also composed of soft magnetic material.

Figure 6:
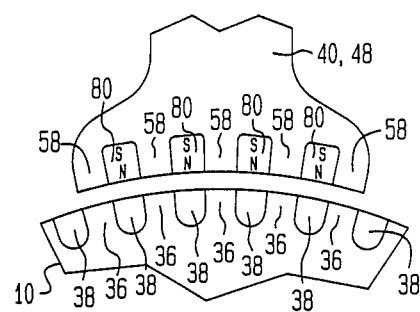
FIGS. 6 to 9 are cross-sectional illustrations showing details of the stator along the cross-section 2—2.
Figure 7:
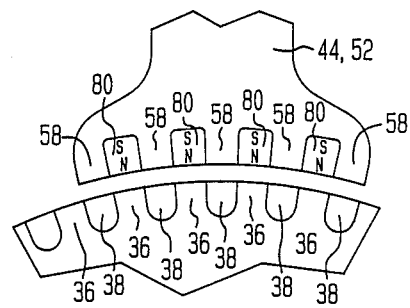
Figure 8:
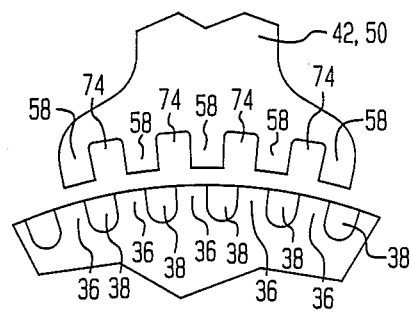
Figure 9:
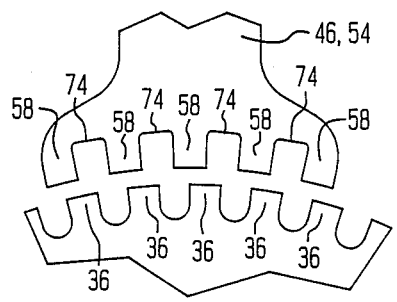

FIGS. 6 to 9 are cross-sectional illustrations showing details of the stator poles 40 to 54 along the cross-section 2—2. FIG. 6 shows details of the poles 40 and 48, FIG. 7 of the poles 40 and 52, FIG. 8 of the poles 42 and 50, and FIG. 9 of the poles 46 and 54. The figures show teeth 58, spaces 74, magnetic material 80 and teeth 36 and 38.

Figure 10:
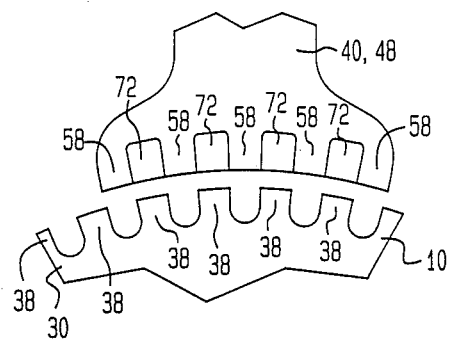
FIGS. 10 to 13 are cross sections showing details of the poles and rotor along the section 4—4.
Figure 11:
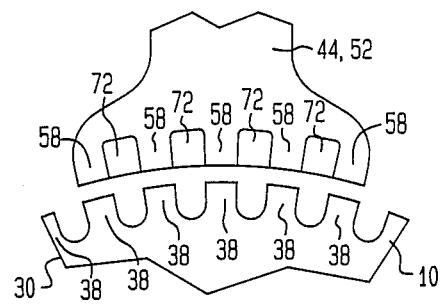
Figure 12:
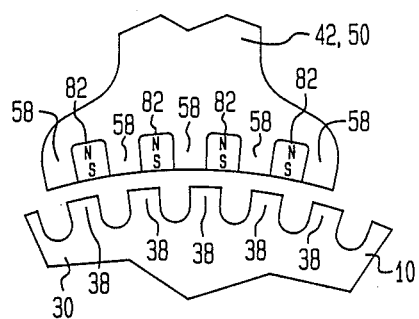
Figure 13:
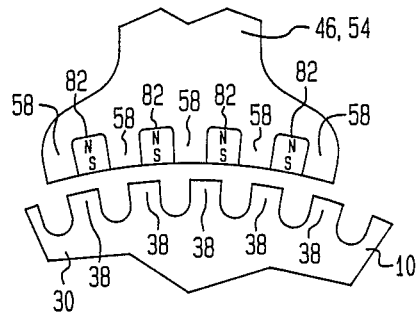

FIGS. 10 to 13 are cross sections showing details of the poles and rotor along the section 4—4. FIG. 10 shows the details of poles 40 and 48, FIG. 11 of poles 44 and 52, FIG. 12 of poles 42 and 50, and FIG. 13 of poles 46 and 54. These figures also show teeth 58, spaces 72, magnetic material 80, and teeth 38.

In operation, the driver D applies voltages which produce currents in the windings 60 on a predetermined sequential basis so that the respective poles 40 to 48 are either north polar or south polar. The sequential pulses rotate the rotor. As can be seen, the rotor segment 28 is north polar. Accordingly, when the rotor is in the position shown in FIG. 2, a pulse at the winding 60 producing a south polar magnetic effect at the poles 42 and 50 will draw the rotor in the clockwise direction. The manner of sequencing the pulses for producing particular speeds and rotational steps is well known.

Movement of the rotor 10 changes the relationships between the rotor teeth 36 and 38 on the one hand and the stator teeth 58 on the other. The enhancing magnets or slot magnets or permanent magnetic materials 80 and 82 in the present embodiments as well as the embodiments in the aforementioned co-pending applications have the effect of increasing the torque and efficiency of motors without such slot magnets. However, the present invention achieves results almost as effective as those achieved with motors having twice the number of enhancing magnets or slot magnets or permanent magnetic materials, namely, motors using permanent magnetic materials in all the slots or valleys of all the teeth in all the poles of the stator.

The theory of the effects of the magnets in the present application and in the magnetically enhanced motors of the copending applications is only partially understood. For example, it is believed that in magnetically enhanced motors the enhancing magnets channel the motor fluxes so as to diminish leakage and produce appropriate coupling between the rotor and the stator across their working air gaps. As the gaps change during rotor motor motion, the permeance (or reluctance) through the motor iron changes. The enhancing magnets are believed to improve the rate of change of permeance (or reluctance) and thereby define the static torque curve at any flux level (current level). Put another way, the competition between the various magnetic potentials, in and across the working air gaps, determines the rate of release of the flux coupling across these gaps so as to improve the torque curve.

It was also the inventors theory that when the current passing through the stator phase coils 60, such as when the rotor is over driven, induces a magnetic flux at the teeth 58, high enough to overcome the rotor bias produced by the magnet 24, the flux from one stator pole will complete a circuit path through the rotor pole, such as 28, and to a peripherally adjacent stator pole. Thus, when the rotor bias from magnet 24 is inadequate for the high current in the coils 60, the flux, rather than passing through the permanent magnet 24 of the rotor, couples peripherally as a variable reluctance motor to complete a flux path back to the initiating coil. This path is believed to retard motion of the rotor and the enhancing magnets are believed to avoid this retardation. That is, they are believed by the inventor to limit the flux flow from an energizing pole through the rotor to a peripherally adjacent stator pole, and thereby reduce the torque retardation.

However, it has also been proposed by the inventor that when the rotor teeth pass through certain positional relationships with respect to the stator teeth, motors without magnets in the valleys between the stator teeth exhibit torque reduction. Specifically, an explanation has been offered that when the rotor teeth pass certain positions, they form a flux path from one pole of the permanent magnet 14 through a rotor segment 28, one end of each of the two stator 40 to 54, the other ends of the two or four poles 40 to 54, the rotor segment 30, and back to the south pole of the permanent magnet 14. This flux path at these positional relationships is assumed to retard rotation of the rotor 10 in motors without enhancing magnets. The inclusion between the stator teeth 58 of permanently magnetized radially poled magnetic material opposing this flux is believed to break the torque-opposing flux paths. Once the rotor leaves these positional relationships the torque-diminishing flux path is believed to be broken otherwise. Hence, this theory propounds that the improvement in engendered by the enhancing magnets arises from their ability to break undesired momentary flux paths. The inventor assumes that these undesired flux paths occur when the rotor teeth directly oppose the spaces between the stator teeth, and that the undesired flux paths include the gaps at these positions. This torque retarding flux path will be referred to as the longitudinal torque retarding flux path.

This invention is based upon the supposition that, in the prior enhanced motors of the copending applications, the radially directed interteeth magnetic materials opposing the magnetic flux path of the permanent magnet 14 interrupt the longitudinal torque retarding flux paths, which occur at the critical rotor positions, in two places in each flux path. This would correspond to opening to series switches in each of the number of electric circuits. The invention presumes that only one such break or switch is necessary. Therefore, according to the invention, the magnetic materials or slot magnets 80 and 82 are placed in only one portion of each longitudinal torque-retarding path. This is accomplished by placing the materials or slot magnets 80 only in the forward intervals 70 of the poles 40, 44, 48, and 52, and placing the slot magnets 82 only in the rear interval 76 of the poles 42, 46, 50, and 54. Each of the set of slot magnets 80 and 82 then cooperates with the surrounding stator teeth 58 and opposing rotor teeth 36 and 38 to interrupt each flux path as the rotor passes a critical position at which the torque-retarding flux path would have occurred. Once the rotor has turned beyond the critical position, the flux paths change otherwise. Thereafter, the rotor enters a new position with new flux paths which the permanent magnetic materials or permanent magnetic slot magnets 80 and 82 interrupt.

Slot magnets generally are believed to have another desirable effect which is especially important at lower current levels when the danger of torque retardation is decreased or may not exist. The inventor believes that the slot magnets 80 and 82 force the flux from the stator poles and from biasing magnet 24 to pass mainly, and possibly exclusively, through the faces of the rotor and stator teeth by passing their own fluxes through other portions of the rotor and stator teeth. In this way, the slot magnets limit the coupling between the faces of the rotor and the stator teeth.

The invention may also be embodied in a linear motor having a stator and actuator. The actuator corresponds to the rotor in a rotating motor. Generically, an actuator and a rotor may be referred to as a mover.

While embodiments of the invention have been described in detail it will evident to those skilled in the art that the invention may embodied otherwise without departing from its spirit and scope.

What is claimed is:

1. An electric motor, comprising:
   a stator;
   a mover mounted for movement relative to said stator;
   said stator having a plurality of poles projecting toward said mover;
   said poles each having a plurality of teeth projecting toward said mover, said stator teeth being composed of soft magnetic material;
   said mover having a plurality of mover teeth projecting toward said stator teeth and being composed of soft magnetic material;
   winding means indictively coupled to said poles for magnetically actuating said stator teeth so as to cause magnetic interaction between said mover teeth and said stator teeth and move said mover teeth relative to said stator teeth along a given direction;
   said stator teeth on each of said poles extending in a longitudinal direction and each of said poles being divided transverse to the longitudinal direction into two pole portions,
   one portion of each of said poles having permanent magnetic means extending along at least one tooth for producing a magnetic field poled transverse to said mover, at least one of said poles having said permanent magnetic means in only one of said two pole portions.

2. A device as in claim 1, wherein said stator teeth extend substantially transverse to the given direction.

3. A device as in claim 1, wherein said mover includes a permanent magnetic arrangement for applying a magnetic field to said mover teeth.

4. A device as in claim 2, wherein said mover includes a permanent magnetic arrangement for applying a magnetic field to said mover teeth.

5. A device as in claim 1, wherein said mover is a cylindrical rotor and said stator is cylindrical.

6. A device as in claim 2, wherein said mover is a cylindrical rotor and said stator is cylindrical.

7. A device as in claim 3, wherein said mover is a cylindrical rotor and said stator is cylindrical.

8. A device as in claim 1, wherein said winding means are inductively coupled to both of said portions on each of said poles.

9. A device as in claim 1, wherein each of said portions has a plurality of teeth.

10. A device as in claim 1, wherein one pole portion of each of said poles has permanent magnetic means extending along each of the teeth for producing magnetic fields poled transversed to the mover.

11. A device as in claim 1, wherein each of the poles has permanent magnetic means in only one of said portions.

12. A device as in claim 1, wherein each of said poles has teeth in each of said portions and each of said poles has permanent magnetic means extending along the teeth of one said portions and only one of said portions.

13. A device as in claim 1, wherein each of said poles has teeth in each of said portions and each of said poles has permanent magnetic means extending along the teeth of one of said portions and only of said portions, said portions on each of said poles being a forward portion and a rearward portion, said permanent magnetic means extending along the teeth in the forward portion on one pole and in the rearward portion on adjacent poles.

14. A device as in claim 1, wherein said permanent magnetic means is poled on one of said poles in a direction transverse to the mover in one direction and in the opposite direction on adjacent poles.

15. A device as in claim 1, wherein
   each of said poles has teeth in each of said portions and each of said poles has permanent magnetic means extending along the teeth of one said portions and only one of said portions, said portions on each of said poles being a forward portion and a rearward portion, said permanent magnetic means extending along the teeth in the forward portion on one pole and in the rearward portion on adjacent poles; and
   wherein said permanent magnetic means is poled on one of said poles in a direction transverse to the mover in one direction and in the opposite direction on adjacent poles.

16. A device as in claim 1, wherein said winding means are inductively coupled to both of said portions on each of said poles, and wherein one pole portion of each of said poles has permanent magnetic means extending along each of the teeth for producing magnetic fields poled transversed to the mover.

17. A device as in claim 1, wherein said winding means are inductively coupled to both of said portions on each of said poles, and wherein each of said poles has teeth in each of said portions and each of said poles has permanent magnetic means extending along the teeth of one said portions and only one of said portions.

18. A device as in claim 1, wherein said winding means are inductively coupled to both of said portions on each of said poles, and wherein each of said poles has teeth in each of said portions and each of said poles has permanent magnetic means extending along the teeth of one said portions and only one of said portions, said portions on each for said poles being a forward portion and a rearward portion, said permanent magnetic means extending along the teeth in the forward portion on one pole and in the rearward portion on adjacent poles.

19. A device as in claim 1, wherein said winding means are inductively coupled to both of said portions on each of said poles, and wherein said permanent magnetic means is poled on one of said poles in a direction transverse to the mover in one direction and in the opposite direction on adjacent poles.

20. A device as in claim 1, wherein
   said winding means are inductively coupled to both of said portions on each of said poles;
   each of said poles has teeth in each of said portions and each of said poles has permanent magnetic means extending along the teeth of one said portions and only one of said portions, said portions on each of said poles being forward portion and a rearward portion, said permanent magnetic means extending along the teeth in the forward portion on one pole and in the rearward portion on adjacent poles; and
   said permanent magnetic means being poled on one of said poles in a direction transverse to the mover in one direction and in the opposite direction on adjacent poles.

* * * * *